(No Model.)

B. F. CROCKER.
SCREW OR NUT FASTENING FOR RAILWAY BAR JOINTS.

No. 287,806. Patented Nov. 6, 1883.

Witnesses.
S. N. Piper
E. B. Pratt

Inventor
Benj. Franklin Crocker
by R. H. Eddy atty.

UNITED STATES PATENT OFFICE.

BENJAMIN FRANKLIN CROCKER, OF HYANNIS, MASSACHUSETTS.

SCREW OR NUT FASTENING FOR RAILWAY-BAR JOINTS.

SPECIFICATION forming part of Letters Patent No. 287,806, dated November 6, 1883.

Application filed September 19, 1883. (No model.)

*To all whom it may concern:*

Be it known that I, BENJAMIN FRANKLIN CROCKER, of Hyannis, in the county of Barnstable, of the Commonwealth of Massachusetts, have invented a new and useful Improvement in Screw or Nut Fastenings for Railway-Bar Joints, &c.; and I do hereby declare the same to be described in the following specification and represented in the accompanying drawings, of which—

Figure 1:
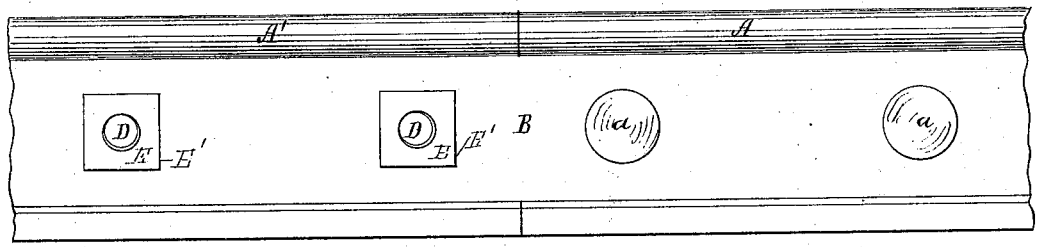
Figure 2:
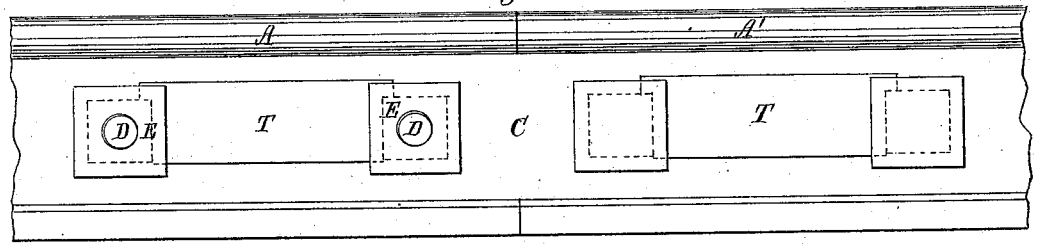
Figure 3:
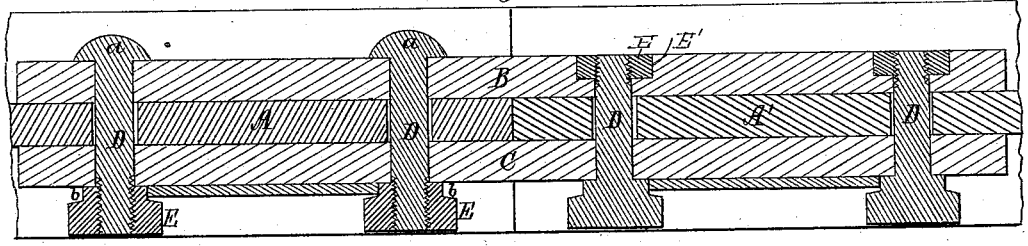
Figure 4:
Figure 5:
Figure 6:
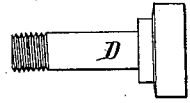
Figure 7:
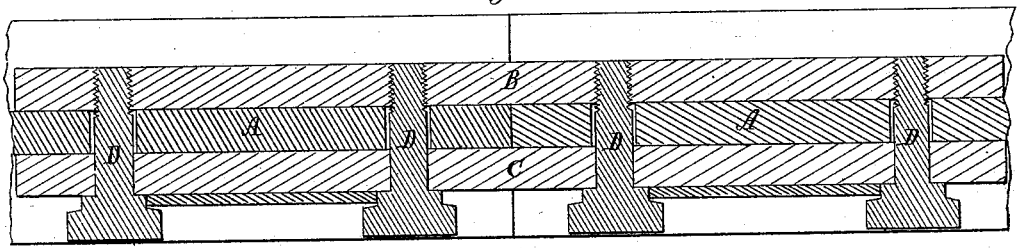

Figures 1 and 2 are opposite side elevations, and Fig. 3 a horizontal section, of two railway-rails and their fish plates or bars, with their "connection-screws" and nuts. Fig. 4 is an edge view of one of the nuts. Fig. 5 shows a T-fastener. Fig. 6 is a side view of a screw or screw-bolt having its head made for being held in place by the said fastener. Fig. 7 is hereinafter explained.

The improvement is to prevent the nut or the bolt from accidentally working loose, as it is liable to, by reason of the shocks or concussions received by the rail or rails from the cars in passing upon them.

In the drawings, A and A' denote the two rails, and B and C their fish bars or plates, which overlap the rails at their joints, and are arranged on opposite sides of such rails, between their heads and bases, in manner as represented. Going through each rail are two screw-bolts, D. Each of the bolt-heads is of the ordinary form, as shown at a, and each of the nuts E is "rabbeted" on each of its four sides, as shown at b, to receive and coact with the "T-fastener," constructed as represented in Fig. 5, it being a rectangular plate having two shoulders, c c, projecting from it, as shown, at the upper parts of its two ends. This T-fastener is slid down between the two next adjacent nuts and in their next adjacent lateral rabbets, the shoulders c c resting on the upper rabbets of the said nuts, the fastener bearing against the fish-plate. From this it will be seen that when the fastener is made to fit closely to the nuts it will not only be sustained in position by them, but will effectually prevent either from being accidentally revolved on its screw-bolt. In some cases, however, the nuts are dispensed with, and the bolts having rabbeted heads go through one fish-plate and the rail or rails and screw into the other fish-plate, such being as shown in Fig. 7, which is a horizontal section of the two rails, their fish plates or bars, and the T-fastener, with the screw-bolts screwed into one of the fish-plates.

The forms already described are old; but I have devised another form in which the "fastener" can be used to a good advantage. This form is shown in section in the right-hand half of Fig. 3. In this form the bolt D with the rabbeted head, as seen in Fig. 6, is used. This bolt D passes through the fish-plates C B and the rail A', and its threaded end engages a nut, E. This nut E fits into a corresponding recess or pocket, E', made in the outer face of the fish-plate B. This nut receives the bolt D, which turns in the nut, the latter being kept from turning by the edges of the pocket E'. After the bolts D are screwed up, the fastener is slipped in place over the rabbeted head, as in the form shown in Fig. 7.

I am aware that it is not new to use a rabbeted-headed bolt with a keeper-plate or fastener, the bolt passing into a nut and the nut held from turning; but in such old construction the fish-plate is made into a longitudinal groove, in which groove all the nuts are placed, and there is no provision for holding each nut in registry with its bolt-hole. In my device, by using the pockets, each nut is held in exact alignment with its hole, and cannot fail to take the bolt, as the nuts cannot possibly slip to one side.

What I claim is—

The rabbeted-headed bolt D, the fastener T, and fish-plates C B and rail A', the fish-plate B having the separate pockets E' at each bolt-hole, in combination with the nuts E, each nut fitting its pocket E' and receiving the bolt D, as set forth.

BENJAMIN FRANKLIN CROCKER.

Witnesses:
WILLARD C. CROCKER,
AUGUSTA P. CROCKER.